United States Patent [19]
Elliott

[11] Patent Number: 5,998,945
[45] Date of Patent: Dec. 7, 1999

[54] HYSTERESIS CURRENT CONTROLLER FOR A RELUCTANCE MACHINE

[75] Inventor: Charles Richard Elliott, West Yorkshire, United Kingdom

[73] Assignee: Switched Reluctance Drives Limited, North Yorkshire, United Kingdom

[21] Appl. No.: 08/986,154

[22] Filed: Dec. 5, 1997

[30] Foreign Application Priority Data

Dec. 12, 1996 [GB] United Kingdom .................... 9625831

[51] Int. Cl.⁶ ................................................ H02K 23/00
[52] U.S. Cl. .......................................... 318/254; 318/701
[58] Field of Search .................................. 318/254, 701, 318/138, 439

[56] References Cited

U.S. PATENT DOCUMENTS

| | | | |
|---|---|---|---|
| 4,933,620 | 6/1990 | MacMinn et al. | 318/696 |
| 4,933,621 | 6/1990 | MacMinn et al. | 318/696 |
| 4,961,038 | 10/1990 | MacMinn | 318/696 |
| 5,166,591 | 11/1992 | Stephens et al. | 318/701 |
| 5,296,787 | 3/1994 | Albrecht et al. | 318/433 |
| 5,361,021 | 11/1994 | Meyer et al. | 318/254 |
| 5,467,025 | 11/1995 | Ray | 318/701 |
| 5,530,333 | 6/1996 | Turner | 318/701 |
| 5,861,727 | 1/1999 | Blackburn et al. | 318/701 |

FOREIGN PATENT DOCUMENTS

| | | |
|---|---|---|
| 0 635 931 A2 | 1/1995 | European Pat. Off. . |
| 0 635 931 A3 | 1/1995 | European Pat. Off. . |

OTHER PUBLICATIONS

Stephenson, Dr. J.M., "The Characteristics, Design and Applications of Switched Reluctance Motors and Drives," Presented at the PCIM '93 Conference and Exhibition at Nürnberg, Germany, pp. 1–68, Jun. 21–24, 1993.

Malesani and Tenti, "A Novel Hysteresis Control Method for Current–Controlled Voltage–Source PWM Inverters with Constant Modulation Frequency," IEEE Transactions on Industry Applications, vol. 26, No. 1, Jan./Feb. 1990, pp. 88–92.

*Primary Examiner*—David Martin
*Attorney, Agent, or Firm*—Patterson & Keough, P.A.

[57] ABSTRACT

A hysteresis current controller includes a hysteresis current control device which has an adjustable hysteresis band. A feedback signal indicative of current in the load is compared with a current demand signal to produce an error signal which is received by the hysteresis control device. The switching output of the hysteresis control device is monitored to derive a signal indicative of its frequency which is used in a control loop to vary the hysteresis band to maintain the switching frequency output substantially constant.

21 Claims, 5 Drawing Sheets

HYSTERESIS CURRENT CONTROLLER FOR A RELUCTANCE MACHINE

BACKGROUND OF THE INVENTION

1. Field of the Invention

This invention relates to hysteresis current controllers for reluctance machines.

2. Description of Related Art

The switched reluctance machine is an example of an electrical load having a variable inductance. It comprises a stator, defining stator poles, and a rotor, defining rotor poles. Energizing windings are wound in relation to the stator poles. Typically, groups of the windings are energized simultaneously as a phase. Energization of the windings of the or each phase is controlled by switching a source of electrical power in a phase circuit including the phase windings. The reluctance machine can be operated as either a motor or a generator. A description of switched reluctance machines and their control can be found in the article 'The Characteristics, Design and Applications of Switched Reluctance Motors and Drives' by Stephenson and Blake, incorporated herein by reference in its entirety and presented at the PCIM '93 Conference and Exhibition at Nurnberg, Germany, Jun. 21–24, 1993.

At low speed, the torque developed by the switched reluctance motor is usually controlled by adjusting the amount of current in the phase windings, i.e. the motor is said to be "current fed". Usually, a voltage source is the most practicable means of deriving electrical power and so a current controller is required. The current controller controls the states of power switches to apply a voltage across the phase winding so as to establish the required current in the phase winding. The performance of the current controller, in both transient and steady-state sense, will be affected by the nature of the electrical load which the phase circuit presents. Unlike d.c. and induction motors, the winding of the switched reluctance machine has neither a constant inductance nor exhibits a simple 'motional EMF' effect. A mathematical expression for the electrical behavior of the switched reluctance phase circuit can be described as:

$$v = iR + 1(i,\theta) di/dt + i\omega \partial L/\partial \theta (i,\theta) \quad (1)$$

where:

v is the phase voltage
R is the phase resistance
i is the phase current
L is the phase inductance
1 is the incremental phase inductance
ω is the rotational speed
θ is the rotor angle relative to the stator The three different terms in equation (1) may be explained as follows:

- the first term (iR) is that due to the resistive voltage drop in the phase winding;
- the second term $(1(i,\theta) di/dt)$ is proportional to the rate of change of phase current and is due to the effective inductance of the phase, i.e. the incremental inductance. This term can be seen to be nonlinear in nature as the incremental inductance is a function of both current and angle. A plot showing the variation in the incremental inductance of a sample switched reluctance machine is shown in FIG. 1 of the drawings which is a graph of incremental inductance against rotor angle for various values of phase current. This shows that incremental inductance can vary by over 10 to 1 for a machine operated over a wide range of currents, for example a servo-drive;
- the last term of equation (1) $(i\omega \partial L(i,\theta)/\partial \theta)$ can be seen to be proportional to the rotational speed (ω) and is therefore sometimes called the "motional EMF". It arises because the phase inductance is a function of rotor angle and therefore varies with time as the machine rotates. It is also nonlinear in nature and depends on how the phase inductance varies with rotor angle at a particular phase current and rotor angle. By way of illustration, FIG. 2 shows the motional EMF for a switched reluctance machine for a given speed and various values of phase current.

One form of current control which is often used with switched reluctance machines is hysteresis current control. It is widely used due to the high bandwidth control attainable and the simplicity of its implementation. Forms of hysteresis current control are described in EP-A-0635931, for example, which is incorporated herein by reference.

Hysteresis current control works by changing the conductive state of power switches in the current controller whenever the current reaches a threshold level above or below the demanded current. The gap between the upper and lower thresholds is known as the hysteresis band. A simple hysteresis current control function is shown in the graph of FIG. 3 where the voltage applied is of a constant magnitude, but opposite polarity, for the on and off states of the power switches and the current is assumed to rise and fall in a linear manner. In practice, this is not the case but serves to illustrate generally the hysteresis chopping waveform in which the current is free to vary within the limits of the upper and lower thresholds and is controlled by switching if it exceeds either threshold.

Simplified expressions for the on and off times (shown in FIG. 3 as $t_{on}$ and $t_{off}$) may be used to derive the following equation:

$$f = (V^2 - i^2_{av} - R^2 - 2i_{av}R\epsilon - \epsilon^2)/2li_h V \quad (2)$$

where:

f is the switching frequency
V is the DC link voltage
$i_{av}$ is the average phase current
R is the phase resistance
ε is the 'motional EMF'
l is the incremental inductance
$i_h$ is the width of the hysteresis band Equation (2) assumes that the instantaneous phase current will rise and fall in a linear manner as stated above. While this is not completely accurate, provided the switching period is short compared with the time constant of the inductive load (which is usually the case for a switched reluctance machine) the error due to this approximation to linearity is acceptably small.

It can be seen from equation (2) that the switching frequency will vary according to the particular phase circuit parameters unless the width of the hysteresis band is adjusted accordingly. In practice, this is not done as it would require the storage of significant amounts of data based on the electromagnetic characteristics of the machine. It would also require the sensing of rotor position and speed, in addition to current, and very rapid data processing to determine the correct width of the hysteresis band. Thus, when conventional hysteresis current control is used, the power switching frequency varies and undesirable acoustic noise often results.

In the simplest form of hysteresis current control, a fixed hysteresis band is used, centered around the demanded current. It is set to ensure that the power switching frequency is such that the maximum acceptable switching losses are not exceeded under any operating conditions of the drive. For example, in a positioning servo-drive based on a switched reluctance machine which is required to operate into overload, this will necessitate having a comparatively wide hysteresis band to cope with the very low incremental inductance encountered at high currents. This in turn can cause significant steady-state error at low average currents, because the positive and negative excursions about the demand current become unequal as soon as the lower bound of the hysteresis band reaches zero current.

SUMMARY OF THE INVENTION

It is one object of the invention to reduce the amount of acoustic noise resulting from the control of a switched reluctance machine having a varying power switching frequency. It is another object of the invention to optimize the hysteresis band for a given set of operating conditions in hysteresis current control of a switched reluctance machine.

A frequency controller according to an embodiment of the invention is used for active adjustment of the width of the hysteresis band in order to regulate the switching frequency. In this way, the switching frequency can be maintained more closely to a preferred rate. It is also possible to control more accurately the phase current in a switched reluctance machine down to lower currents using the current controller of the invention.

To control the current a signal indicative of current is required. This may be a feedback signal of current or a signal derived from another variable which is indicative of current.

BRIEF DESCRIPTION OF THE DRAWINGS

The present invention can be put into practice in various ways, some of which will now be described by way of example with reference to the accompanying drawings in which.

DETAILED DESCRIPTION OF PREFERRED EMBODIMENTS

Figure 1:
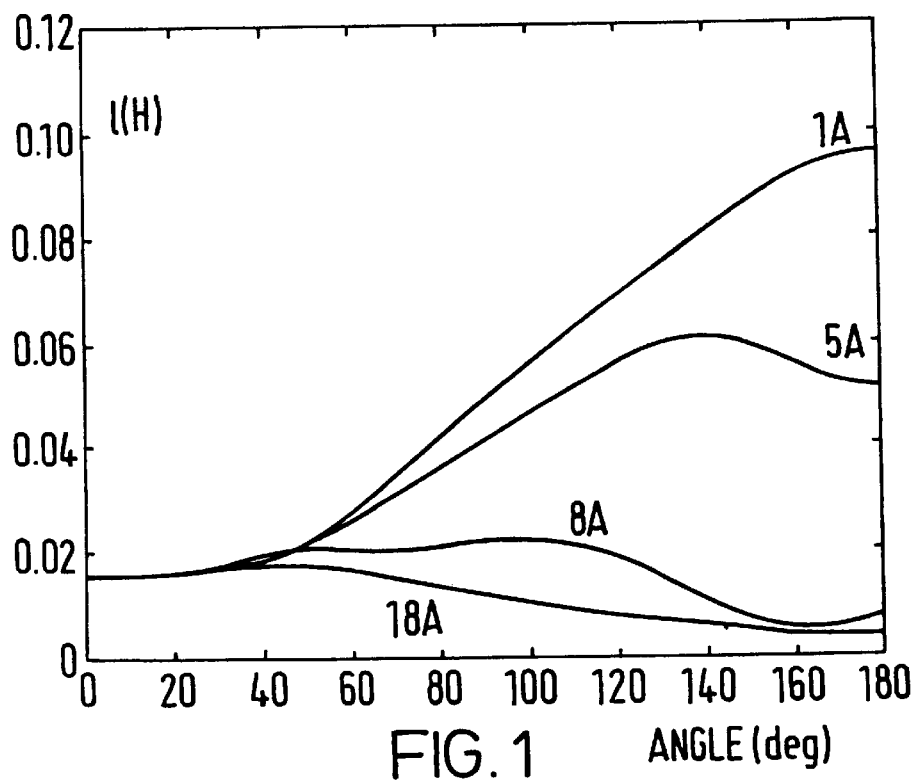
FIG. 1 is a graph of incremental inductance against the electrical angle of rotation over half a cycle of the switched reluctance machine for various phase current values.
Figure 2:
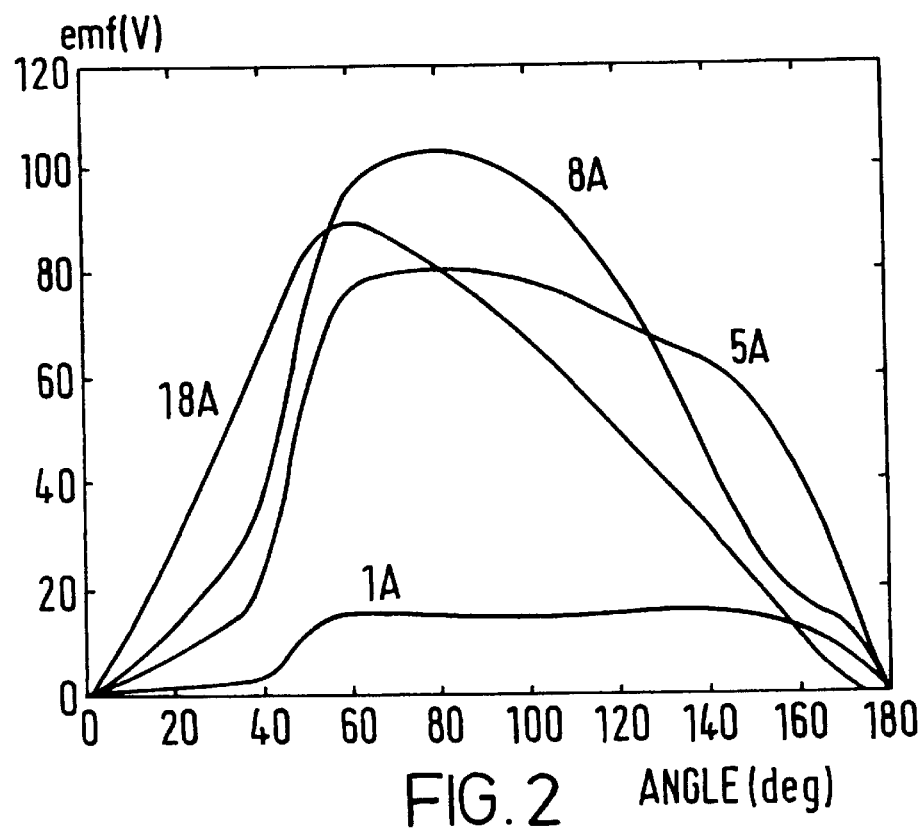
FIG. 2 is a graph of motional EMF against electrical angle of rotation over half a cycle of a switched reluctance machine for various phase current values.
Figure 3:
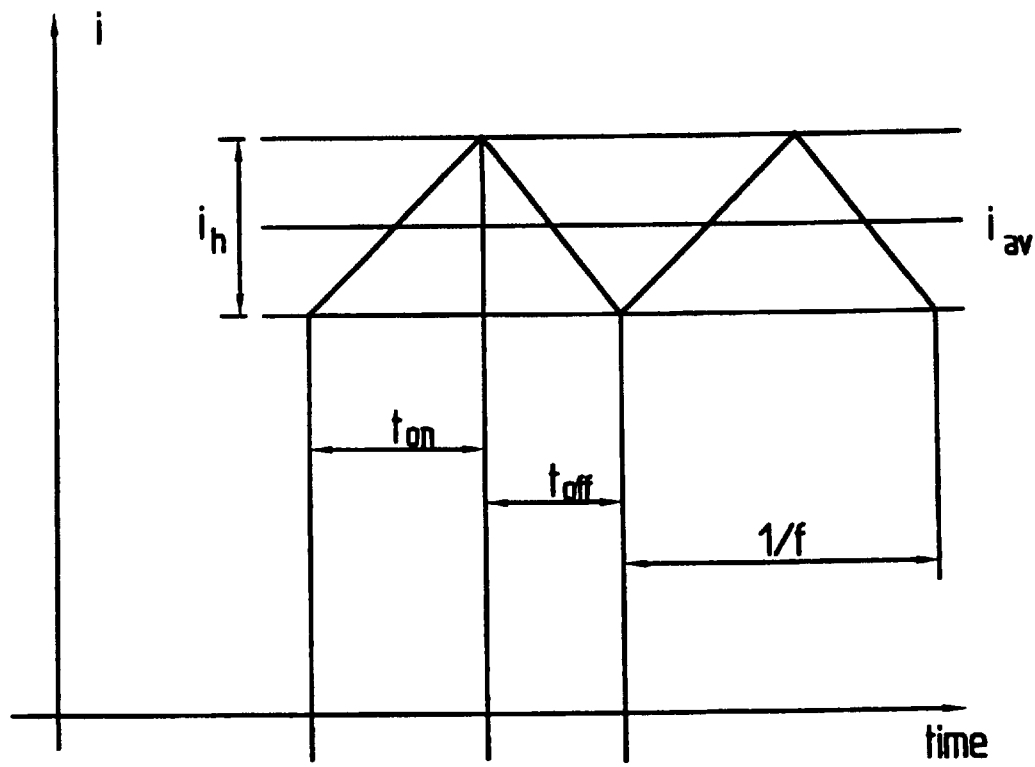
FIG. 3 is a graphical illustration of phase current switching between hysteresis current thresholds.
Figure 4:
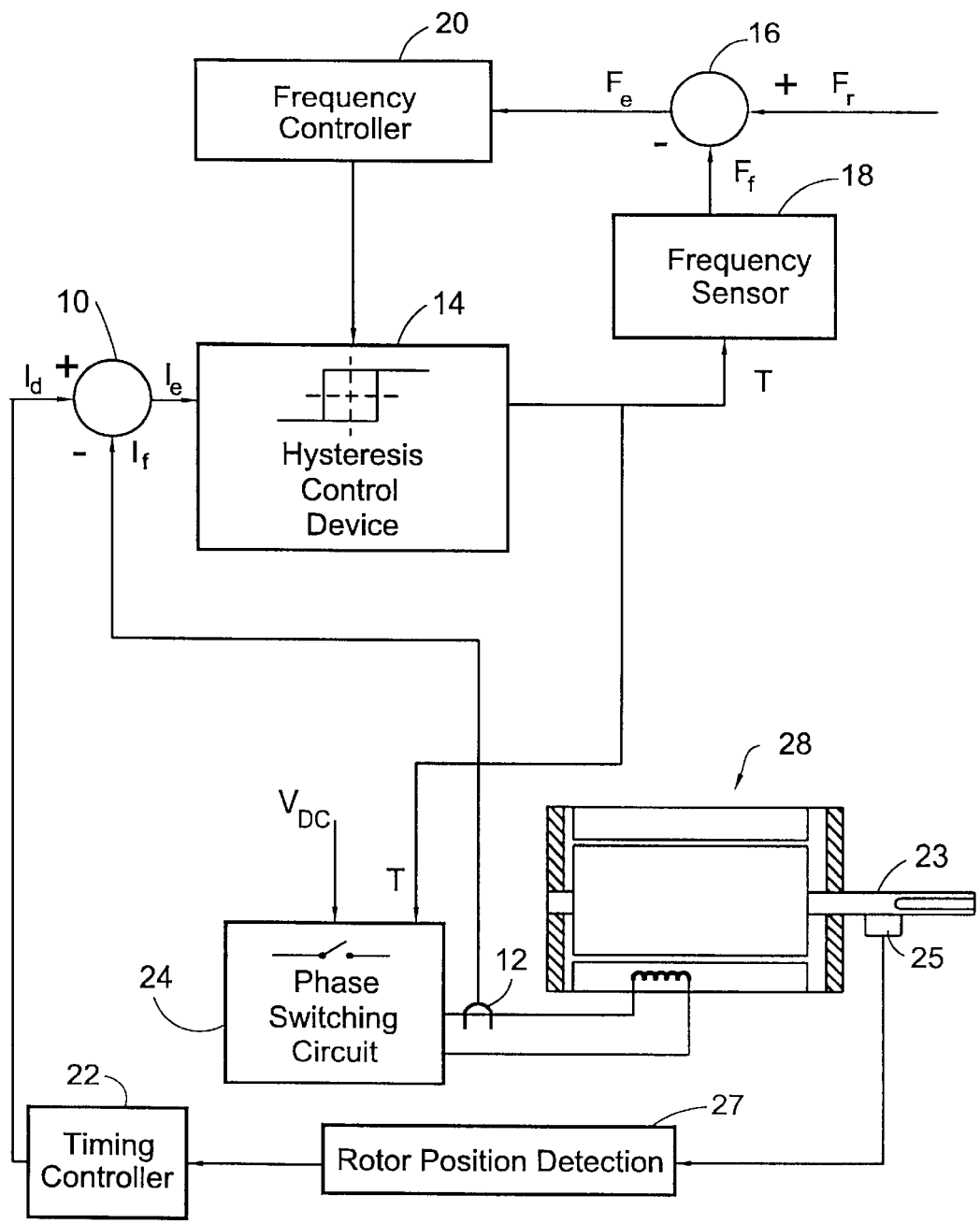
FIG. 4 is a generalized schematic block diagram of a current controller according to an embodiment of the invention.

Referring to FIG. 4, a switched reluctance drive includes a hysteresis current controller, comprising a first error amplifier 10 which provides an error signal $I_e$ which is indicative of the difference between a motor current demand signal $I_d$ and a motor current feedback signal $I_f$. The signal $I_f$ is derived from the phase current in the stator winding of the switched reluctance machine 28 by a current transducer 12.

The error signal $I_e$ is supplied as an input to a hysteresis control device 14. The output of the device 14 is a switch firing signal T which is arranged to activate selectively the power switches of a particular phase circuit of the motor by which voltage is applied to the phase windings.

In this embodiment the timing of the phase conduction periods for each phase and the phase sequence are controlled by a controller 22 that demands the appropriate current according to the position information from the rotor of the machine 28. In this embodiment, the rotor position information is derived from the rotor shaft 23 by a position transducer 25 and a signal processor 27. Those skilled in the art will recognize that other forms of rotor position detection can be used, e.g. as taught in U.S. Pat. No. 5,467,025, which is incorporated herein by reference. FIG. 4 illustrates only one phase switching circuit 24 for the machine 28. In general, the machine will have other phases, each with its own switching circuits. Alternatively, the switching circuits can be shared by two or more phases. The timing and sequencing of the switching is conventional to the switched reluctance machine art and will not be described in further detail here. The embodiment of FIG. 4 notionally can be subdivided into a current control loop, which per se is conventional in the art, and a frequency control loop. It will be appreciated by one skilled in the art that most of the blocks of FIG. 4 can be implemented in either hardware or software.

The output of the hysteresis control device 14 is the firing signal for the phase of the switched reluctance machine 28. Thus, timed to each phase conduction period, the hysteresis control device 14 will provide a series of firing pulses in order to control the voltage across the phase winding to regulate the current in the winding between the upper and lower thresholds of the hysteresis band.

A second error amplifier 16 provides a frequency error output $F_e$ which is indicative of the difference between a reference switching frequency $F_r$ and a frequency feedback signal $F_f$. The signal $F_r$ need not be constant—it can be under the control of a user or it can be programmed to vary in response to either some other event or a cyclical pattern of events. The signal $F_f$ is derived by a frequency sensor 18 from the switch firing output of the hysteresis control device 14.

The frequency error signal $F_e$ is applied to a frequency controller 20 which provides a hysteresis width $I_h$ to the hysteresis control device 14.

The signal $I_d$ is of a sign and magnitude that is proportional to the level of current demanded. If the width of the hysteresis band were to remain fixed, then the switching frequency of the current controller would vary according to the particular operating point (as defined above in equation (2)).

By sensing the frequency with which switching occurs due to the current error signal $I_e$ traversing one of the hysteresis thresholds, the controller according to an embodiment of the invention is able to adjust the upper and/or lower hysteresis limits so that the average switching frequency is controlled to center on the predetermined reference frequency $F_r$.

The frequency controller varies the hysteresis width $I_h$ slowly compared with the rate at which phase current is controlled. In this way, the average switching frequency is regulated, whatever the particular phase operating conditions. This will be explained in more detail below.

Figure 5:
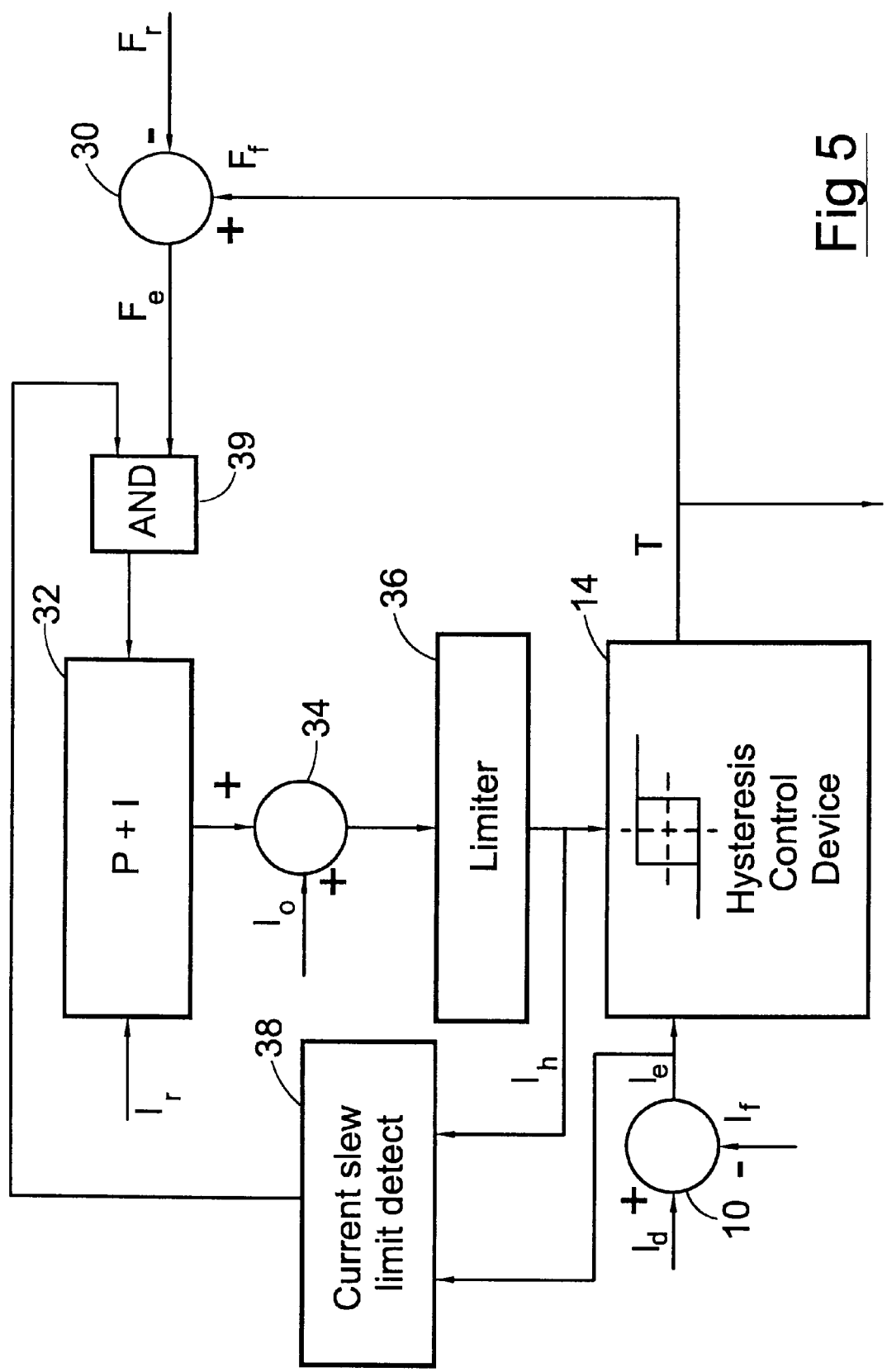
FIG. 5 is a more detailed schematic block diagram of a first embodiment of a controller of the invention.

An embodiment of the invention is shown in more detail in FIG. 5. The control of the switching frequency is implemented by the use of a phase locked loop (PLL) which incorporates the hysteresis control device 14 as the voltage controlled oscillator (VCO) of the PLL. The frequency comparator is a type II digital phase sensitive detector (PSD) 30. The type II detector is used because it allows correct operation despite the duty cycle of $F_r$ and $F_f$ being different. It also will be noted that the feedback frequency signal $F_f$ is applied to the non-inverting input + of the comparator 30 and the reference frequency $F_r$ is applied to the inverting input − of the comparator 30. This takes account of the inverse relationship between the width of the hysteresis band and the switching frequency, i.e. as the hysteresis band increases, the switching frequency decreases at a particular operating point.

A proportional-plus-integral (P+I) compensator 32 is used as the frequency controller. It receives the error frequency signal $F_e$ from the PSD 30. It will be appreciated by the skilled person that, by the nature of the cyclical excitation current supplied to a switched reluctance machine, current does not usually flow continuously in any one phase, unlike, for example, the case of the three-phase induction motor. Thus, in between periods of energization of the windings of each of the phases, the VCO function of the hysteresis control device 14 is effectively disabled. This also happens when the rate of change of demand current exceeds the slew limit of the system to react, the supply voltage determining the rate of change of excitation current. Thus, due to the intermittent nature of the phase excitation current, it is of significant advantage if the PLL is able to acquire lock rapidly and reliably at the start of each phase excitation period. It is also advantageous if the PLL is able to 'ride through' transient disturbances in the controlled current that give rise to the PLL losing lock, such that rapid reacquisition of lock is achieved. The control action to allow this to happen is described below.

In FIG. 5 an adjustable offset $I_O$ is provided through an adder 34 on the control signal output from the P+I compensator 32. The value of the offset $I_O$ is an initial estimation of the appropriate width of the hysteresis band required at the start of the excitation period. By providing the offset, the PLL does not have to start from zero hysteresis width in order to achieve lock and acquisition can be more rapid as a result.

A limiter 36 is applied to the control output of the adder 34 so that the excursions of the hysteresis band are confined between fixed limits so that excessive switching frequencies, which may occur during loop acquisition, are avoided. Having such a nonlinear element within the control loop of the PLL also aids lock acquisition.

The system is also designed to assist the PLL to provide a smooth control function in the presence of rapid fluctuations in demand current. By 'rapid' is meant at such a rate that the switching frequency drops to zero as the phase current is slew limited due to the finite forcing voltage available from the power supply $V_{DC}$. This is achieved by a current slew limit detector 38 which receives the current error signal $I_e$ and the output of the limiter which is the hysteresis width signal $I_h$. The output of the detector 38 is supplied to one input of a two-input AND gate 39. The other input to the AND gate 39 is the output of the PSD 30. The output of the AND gate 39 is the output $F_e$ of the PSD 30 gated by the slew limit detector 38 and supplied to the P+I compensator 32. When the rate of change of the error current signal $I_e$ is such that slew limiting results, the output of the PSD 30 is disabled from being applied to the P+I compensator 32. Once any such transient condition has passed, a slew rate detector output changes state to enable the output of the PSD 30 to be applied to the P+I compensator. This prevents the P+I controller 32 from reacting to the VCO action of the hysteresis current controller having been disabled during slew limit. It also allows lock to be reestablished relatively rapidly, the PLL having ridden through the transient condition.

Lastly, the speed at which the PLL is able to achieve lock is assisted by a reset input $I_r$ to the P+I compensator 32 which resets the integral term to zero whenever there is no phase energization for the system to control, i.e. the reset signal is timed to remove the integral term outside a phase conduction period.

This embodiment of the invention uses a phase locked loop incorporating the hysteresis control device as the voltage controlled oscillator (VCO). The gain of the VCO in this implementation of a PLL will vary by a significant amount according to the particular operating conditions. This will cause the dynamic response of the PLL to vary according to the operating conditions, but not the response of the current regulating loop providing the firing signals to the phase switches. Embodiments of the invention exploit the fact that a signal (either digital or analog) of the desired switching frequency can be used as the input to a feedback control loop which adjusts the hysteresis band in response to the monitored switching frequency.

The bandwidth of the PLL control of the frequency is preferably significantly narrower than that of the current control loop. For example, it is considered practicable for the PLL bandwidth to be a factor of about 10 narrower than that of the current control loop. The response of the PLL for the purposes of controlling frequency is based on an average of a number of periods of the switching frequency. If the PLL were too responsive there would be a risk of system instability as one control loop attempted to react to changes in the other loop.

Figure 6:
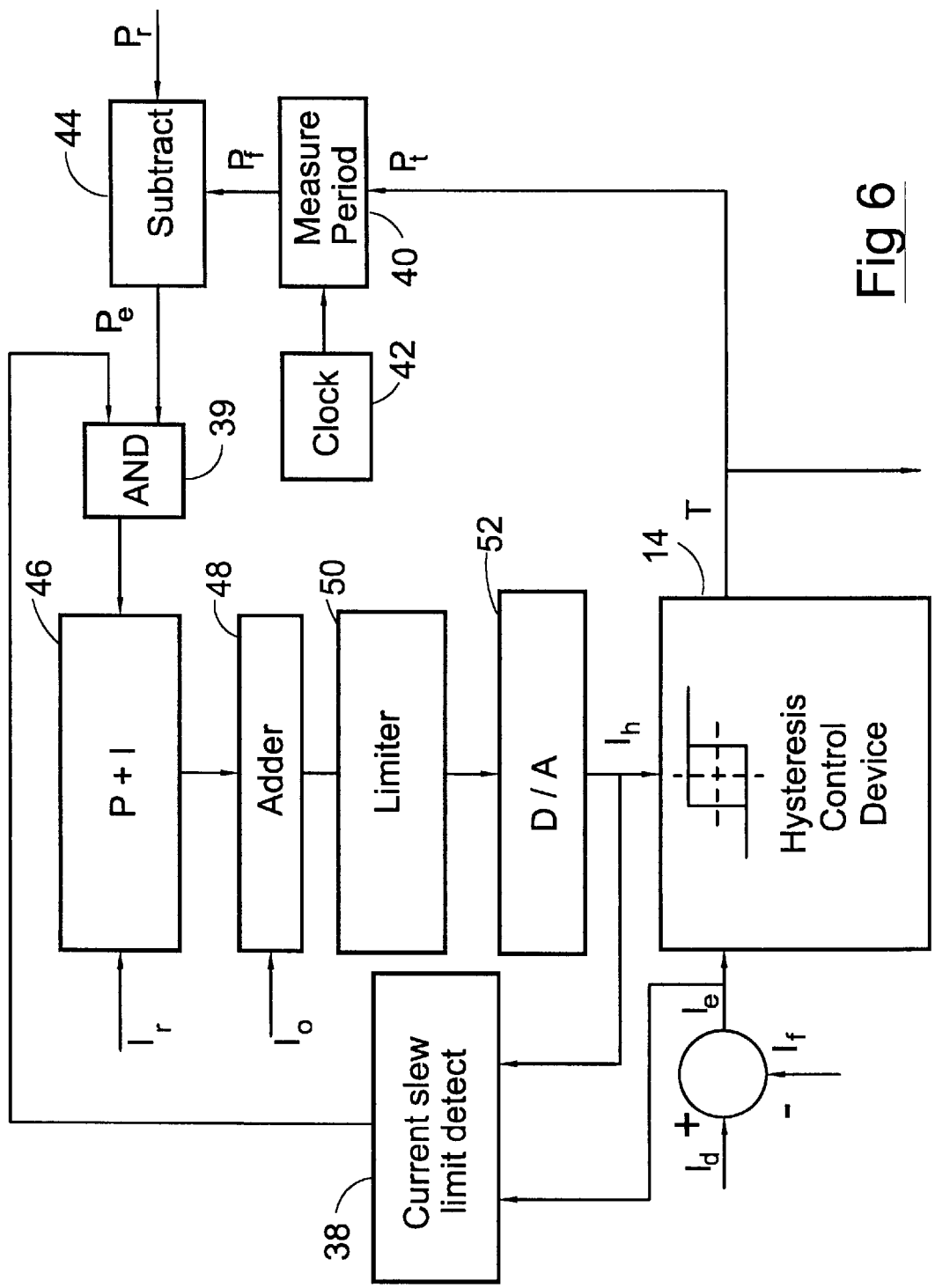
FIG. 6 is a more detailed schematic block diagram of a second embodiment of a controller of the invention.

FIG. 6 shows an alternative form of the invention which is a more fully digital embodiment detecting switching period instead of frequency. The switch firing signal T is applied to a period measurement device 40. The device determines the switch actuation period $P_f$ by counting the number of transitions of a digital high frequency clock 42 during an enabled period corresponding to the switch actuation period. A digital subtractor 44 derives the difference between the output $P_f$ of the measurement device 40 and a reference switching period signal $P_r$. The subtraction can take the form of well-known 2's complement adders.

The offset $I_o$ is applied to the output of a digital P+I compensator 46 by a digital adder 48. A digital limiter 50 defines the maximum and minimum widths of the hysteresis band. A digital to analog converter 52 receives the digital output of the limiter 50 to produce the analog hysteresis band control signal $I_h$.

In other respects, the embodiment of FIG. 6 is equivalent to FIG. 5. In both cases, the desired switching frequency is controlled by a loop that is added to the current control loop. In practice, this implementation could largely be done in software.

While the invention has been described in connection with the illustrative embodiments discussed above, those skilled in the art will recognize that many variations may be made without departing from the present invention. While analog and digital phase locked loops are described above, it will be apparent that other forms of control loop could be used, as known in the control systems art. Also, forms of control regime other than the proportional-plus-integral action described above could be used. For example, a pole zero approximation could be used. It will be realized by the skilled person that parts of the circuit could be implemented in either digital, analog or software form. Accordingly, the above description of embodiments is made by way of example and not for the purposes of limitation. The present invention is intended to be limited only by the spirit and scope of the following claims.

What is claimed:

1. A method of controlling current in a switched reluctance machine having at least one winding, the method comprising:

deriving a current signal indicative of the current;

setting a hysteresis band about a level indicative of a desired current;

switching the current when the current signal indicates that the current has traversed a limit of the hysteresis band so as to return the current to within the hysteresis band;

monitoring the frequency of switching; and adjusting the width of the hysteresis band in response to the monitored frequency to regulate the frequency of switching.

2. A method as claimed in claim 1 in which the hysteresis band is adjusted in response to the monitored frequency to maintain a switching frequency substantially at a desired rate.

3. A method as claimed in claim 1, including comparing the monitored frequency with a reference frequency to produce a frequency error signal and generating a control signal based on the frequency error signal and a control function.

4. A method as claimed in claim 3 in which the control function is a proportional-plus-integral control function.

5. A method as claimed in claim 4 in which the integral term of the control function is set to zero when no current flows in the winding.

6. A method as claimed in claim 3 in which an offset is added to the control signal.

7. A method as claimed in claim 1, including limiting the minimum and/or maximum width of the hysteresis band.

8. A method as claimed in claim 1, including deriving a signal indicative of the slew rate of the current and disabling the control signal when the slew exceeds a predetermined rate.

9. A method as claimed in claim 1, including comparing a desired current level signal with the current signal to derive a current error signal, the hysteresis band being set around zero current error.

10. A method as claimed in claim 1 in which the current signal is a feedback signal.

11. A switched reluctance machine system comprising a switched reluctance machine having a rotor, a stator and at least one phase winding, the system comprising:

means for deriving a current signal indicative of current in the winding;

switching means for applying a voltage to the winding;

error detecting means for comparing the current signal with a signal indicative of a desired current to produce an error signal;

hysteresis controlling means for receiving the error signal and being operable to actuate the switch means when the error signal exceeds an upper or lower hysteresis threshold to return the current to within the hysteresis band;

monitoring means for monitoring the frequency of switching; and means for adjusting the width of the hysteresis band in response to the monitored frequency to regulate the frequency of switching.

12. A system as claimed in claim 11, wherein the monitoring means for monitoring the frequency of switching produces an output, the means for adjusting being operable to generate a frequency control signal based on the said output, the hysteresis controlling means being responsive to the frequency control signal to adjust the width of the hysteresis band.

13. A system as claimed in claim 12 in which the hysteresis controlling means is responsive to the frequency control signal to adjust the hysteresis band to maintain the switching frequency substantially at a desired rate.

14. A system as claimed in claim 13 further comprising error detecting means for producing a frequency error signal according to the difference between the output of the monitoring means and the desired rate.

15. A system as claimed in claim 14 in which the frequency controlling means comprises a proportional-plus-integral controller.

16. A system as claimed in claim 12 including offset means for adding an offset to the frequency control signal.

17. A system as claimed in claim 12, including slew rate monitoring means for monitoring the slew rate of the current in the winding and for disabling the control signal when the current slew exceeds a predetermined rate.

18. A system as claimed in claim 11, including means for setting the integral control term of the controller to zero when no current flows in the winding.

19. A system as claimed in claim 12, including a limiter arranged to limit the minimum and/or maximum width of the hysteresis band.

20. A switched reluctance machine system comprising a switched reluctance machine having a rotor, a stator and at least one phase winding, the system comprising:

a current transducer for deriving a current signal indicative of current in the winding;

a switching arrangement for applying a voltage to the winding;

an error detector for comparing the current signal with a signal indicative of a desired current to produce an error signal;

a hysteresis controller for receiving the error signal and being operable to actuate the switching arrangement when the error signal exceeds an upper or lower hysteresis threshold to return the current to within the hysteresis band;

a monitoring arrangement for monitoring the frequency of switching; and an adjuster for adjusting the width of the hysteresis band in response to the monitored frequency to regulate the frequency of switching.

21. A system as claimed in claim 20, wherein the monitoring arrangement for monitoring the frequency of switching produces an output, the adjuster comprising a proportional-plus-integral controller and being operable to generate a frequency control signal based on the output, the hysteresis controller being responsive to the frequency control signal to adjust the width of the hysteresis band to maintain the switching frequency substantially at a desired rate; and wherein the system further comprises an error detector producing a frequency error signal according to the difference between the output of the monitoring arrangement and the desired rate.

* * * * *